United States Patent
Lee et al.

(10) Patent No.: US 8,532,413 B2
(45) Date of Patent: Sep. 10, 2013

(54) ENTROPY ENCODING/DECODING METHOD AND APPARATUS FOR HIERARCHICAL IMAGE PROCESSING AND SYMBOL ENCODING/DECODING APPARATUS FOR THE SAME

(75) Inventors: Chang-Hyun Lee, Suwon-si (KR); Pil-Kyu Park, Seoul (KR); Dae-Hee Kim, Suwon-si (KR); Dae-Sung Cho, Seoul (KR); Min-Woo Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 13/232,650

(22) Filed: Sep. 14, 2011

(65) Prior Publication Data

US 2012/0093425 A1  Apr. 19, 2012

Related U.S. Application Data (60) Provisional application No. 61/392,637, filed on Oct. 13, 2010, provisional application No. 61/392,702, filed on Oct. 13, 2010.

(30) Foreign Application Priority Data

Mar. 14, 2011 (KR) .................. 10-2011-0022593

(51) Int. Cl.
  *G06K 9/36* (2006.01)
(52) U.S. Cl.
  USPC .................. 382/239; 382/232; 382/233
(58) Field of Classification Search
  USPC ............. 382/232, 233, 236, 239, 240, 250; 348/420.1; 375/240.24, 240.23, E7.027, 375/E7.031
  See application file for complete search history.

(56) References Cited

U.S. PATENT DOCUMENTS

| | | | |
|---|---|---|---|
| 6,625,217 B1 * | 9/2003 | Jacquin et al. | 375/240.19 |
| 6,728,316 B2 * | 4/2004 | Enficiaud et al. | 375/240.19 |
| 8,179,974 B2 * | 5/2012 | Tu et al. | 375/240.24 |

* cited by examiner

*Primary Examiner* — Anh Do
(74) *Attorney, Agent, or Firm* — Sughrue Mion, PLLC (57) ABSTRACT

Entropy decoding, after encoding, includes performing symbol decoding on a bitstream of a received residual picture in units of two, three, or four symbols according to a context model which is set in the two, three, or four symbol units, and ordering the decoded coefficients of the residual picture in their original order in the frequency domain. Symbol and level decoding may be performed together. A unique symbol value may be used.

37 Claims, 11 Drawing Sheets

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

| 2 symbols | | | | 3 symbols | | | | | | 4 symbols | | | | |
|---|---|---|---|---|---|---|---|---|---|---|---|---|---|---|
| overSym=1 | | overSym=2 | | overSym=1 | | | overSym=2 | | | overSym=1 | | | overSym=2 | |
| 1st | 2nd | 1st | 2nd | 1st | 2nd | 3rd | 1st | 2nd | | 1st | 2nd | 3rd | 1st | 2nd |
| SAME AS CONVENTIONAL | | SAME AS CONVENTIONAL | | 10 | 0 | 10 | 10 | 110 | | 01 | 10 | 0 | SAME AS CONVENTIONAL | |
| | | | | 00 | 111 | 01 | 011 | 101 | | 110 | 00 | 101 | | |
| | | | | 111 | 100 | 00 | 001 | 011 | | 001 | 110 | 100 | | |
| | | | | 110 | 1101 | 110 | 1110 | 010 | | 000 | 011 | 1110 | | |
| | | | | 010 | 1100 | 1110 | 1100 | 1111 | | 1110 | 0101 | 1100 | | |
| | | | | 0111 | 1011 | 11111 | 0001 | 1110 | | 1001 | 11111 | 11010 | | |
| | | | | 0110 | 1010 | 11110 | 0000 | 1000 | | 11110 | 01001 | 111110 | | |
| | | | | | | | 11110 | 0010 | | 10111 | 01000 | 111101 | | |
| | | | | | | | 11011 | 0001 | | 10110 | 111101 | 111100 | | |
| | | | | | | | 11010 | 10011 | | 10101 | 111100 | 110110 | | |
| | | | | | | | 01010 | 00111 | | 10100 | 111010 | 1111111 | | |
| | | | | | | | 01001 | 00110 | | 10001 | 111001 | 1101101 | | |
| | | | | | | | 01000 | 00000 | | 10000 | 111000 | 1101110 | | |
| | | | | | | | 111111 | 100101 | | 111111 | 1110111 | 11111101 | | |
| | | | | | | | 010110 | 100100 | | 111110 | 1110110 | 11111100 | | |
| | | | | | | | 1111101 0000100 | | | | | | | |
| | | | | | | | 1111100 0000101 | | | | | | | |
| | | | | | | | 0101111 0000110 | | | | | | | |
| | | | | | | | 0101110 0000111 | | | | | | | |

ENTROPY ENCODING/DECODING METHOD AND APPARATUS FOR HIERARCHICAL IMAGE PROCESSING AND SYMBOL ENCODING/DECODING APPARATUS FOR THE SAME

CROSS-REFERENCE TO RELATED PATENT APPLICATION

This application claims priority from Korean Patent Application 10-2011-0022593, filed on Mar. 14, 2011, U.S. Provisional Patent Application 61/392,702, filed on Oct. 13, 2010, and U.S. Provisional Patent Application 61/392,637, filed on Oct. 13, 2010, the entire disclosures of which are hereby incorporated herein by reference.

BACKGROUND

1. Field

The inventive concept relates to an image processing method and apparatus, and more particularly to, an entropy encoding/decoding method and apparatus, which is applicable to a technique for hierarchical image processing, and a symbol encoding/decoding method and apparatus for the same.

2. Description of the Related Art

A digital image requires large-volume data processing. For large-volume data processing, most image processing techniques use various compression techniques for encoding/decoding an image in block units.

Generally, an image processing technique performs image processing in units of macro-blocks. Macro-blocks are each divided into a plurality of pixel blocks to be processed. Image coding is performed by image processing operations such as motion prediction, motion compensation, Discrete Cosine Transform (DCT), quantization, entropy coding, etc. Entropy coding is a coding scheme for improving image compression efficiency by using different-length codes. The codes indicate symbols according to the probabilities of occurrence of the symbols. That is, short code words are mapped to frequently-occurring symbols. To reduce the amount of processing of large-volume image data, some known techniques perform image encoding/decoding using a residual picture between images. Likewise, some known techniques process an image in various hierarchical structures using a residual image, such as is the case in an image codec of the VC series.

SUMMARY

Accordingly, an aspect of the inventive concept relates to providing an efficient entropy encoding/decoding method and apparatus intended for use in connection with hierarchical image processing.

Another aspect of the inventive concept relates to providing a symbol encoding/decoding method and apparatus for improved performance of entropy encoding/decoding when used in connection with hierarchical image processing.

Moreover, another aspect of the inventive concept relates to providing a symbol and level encoding/decoding method and apparatus for improved performance of entropy encoding/decoding when used in connection with hierarchical image processing.

Furthermore, another aspect of the inventive concept relates to providing a hierarchical image encoding/decoding method and apparatus to which improved entropy encoding/decoding is applied.

According to an exemplary embodiment, an entropy encoding method in hierarchical image processing includes the re-ordering of the coefficients of an input residual picture according to a frequency domain. Symbol encoding is performed on the re-ordered coefficients of the residual picture in units of two, three, or four symbols according to a context model. The context model is set in the two, three, or four symbol units. In other words, symbol encoding is performed in symbol units, and the number of symbols in the symbol units can have a value in the range of two to four symbols, and furthermore the respective number of symbols in a symbol unit is based on a corresponding context model set in units of two to four symbols.

According to another exemplary embodiment, an entropy encoding method in hierarchical image processing includes the re-ordering of the coefficients of an input residual picture according to a frequency domain. Symbol encoding and level encoding are performed together on the coefficients of the residual picture, in units of at least two symbols.

According to another exemplary embodiment, an entropy encoding method in hierarchical image processing includes the re-ordering of the coefficients of an input residual picture according to a frequency domain. Symbol encoding is performed, on the coefficients of the residual picture in units of at least two symbols, by using a unique symbol value.

According to another exemplary embodiment, an entropy decoding method in hierarchical image processing includes performing symbol decoding on a bitstream, of a received residual picture, in units of two, three, or four symbols according to a context model which is set in the two, three, or four symbol units. Decoded coefficients of the residual picture are ordered in an original order in the frequency domain.

According to another exemplary embodiment, an entropy decoding method in hierarchical image processing includes performing symbol decoding and level decoding together on a bitstream of a received residual picture in units of at least two symbols, and ordering the decoded coefficients of the residual picture in an original order in the frequency domain.

According to another exemplary embodiment, an entropy decoding method in hierarchical image processing includes performing symbol decoding, on a bitstream of a received residual picture, in units of at least two symbols, by using a unique symbol value. The decoded coefficients of the residual picture are ordered in an original order in the frequency domain.

According to another exemplary embodiment, an entropy encoding apparatus used in connection with hierarchical image processing includes a re-ordering unit for re-ordering the coefficients of an input residual picture according to a frequency domain. In addition, a symbol encoder performs symbol encoding on the re-ordered coefficients of the residual picture in units of two, three, or four symbols according to a context model. The context model is itself set in two, three, or four symbol units.

According to another exemplary embodiment, an entropy decoding apparatus in hierarchical image processing includes a symbol decoder for performing symbol decoding on a bitstream of a received residual picture, in units of two, three, or four symbols, according to a context model which is itself set in two, three, or four symbol units. In addition, an ordering unit orders the decoded coefficients of the residual picture in the original order in the frequency domain.

According to another exemplary embodiment, an entropy encoding apparatus in hierarchical image processing includes a re-ordering unit for re-ordering the coefficients of an input residual picture according to a frequency domain. The apparatus also includes a symbol encoder for performing symbol encoding on the re-ordered coefficients of the residual picture, in units of at least two symbols, by using a unique symbol value. The apparatus further includes a level encoder for performing level encoding with respect to the re-ordered coefficients of the residual picture. Encoding using the level encoder immediately follows encoding using the symbol encoder, if necessary.

According to another exemplary embodiment, an entropy decoding apparatus includes a symbol decoder for performing symbol decoding on a bitstream of a received residual picture, in units of at least two symbols, by using a unique symbol value. The decoding apparatus also includes a level decoder for performing level decoding. The decoding apparatus further includes an ordering unit for ordering the decoded coefficients of the received residual picture, in their original order in the frequency domain. Decoding by the level decoder immediately follows the decoding by the level decoder if necessary.

BRIEF DESCRIPTION OF THE DRAWINGS

The above and other features and advantages of exemplary embodiments of the inventive concept will be more apparent from the below detailed description taken in conjunction with the accompanying drawings, in which.

DETAILED DESCRIPTION OF THE EXEMPLARY EMBODIMENT

In the following description, some details have been omitted so as to avoid obscuring the inventive concept. It will be understood, moreover, that various details are included merely for the sake of a clear explanation, and that such details are not fundamental aspects of the inventive concept, and thus may be varied in accordance with particular implementations. Hereinafter, an exemplary embodiment will be described with reference to the accompanying drawings.

Figure 1:
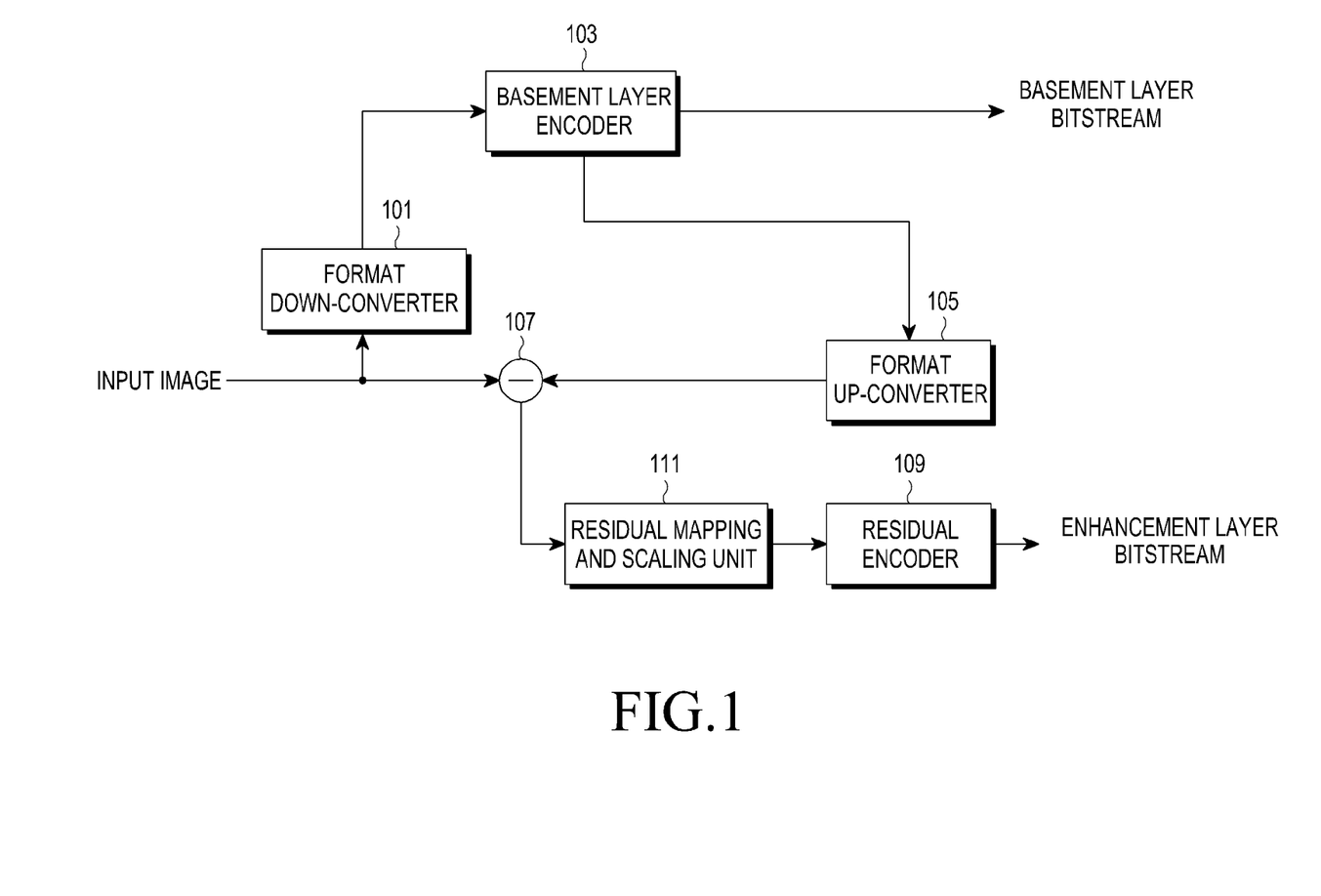
FIG. 1 is a block diagram of a multi-layer structure image encoding apparatus according to an exemplary embodiment.
Figure 2:
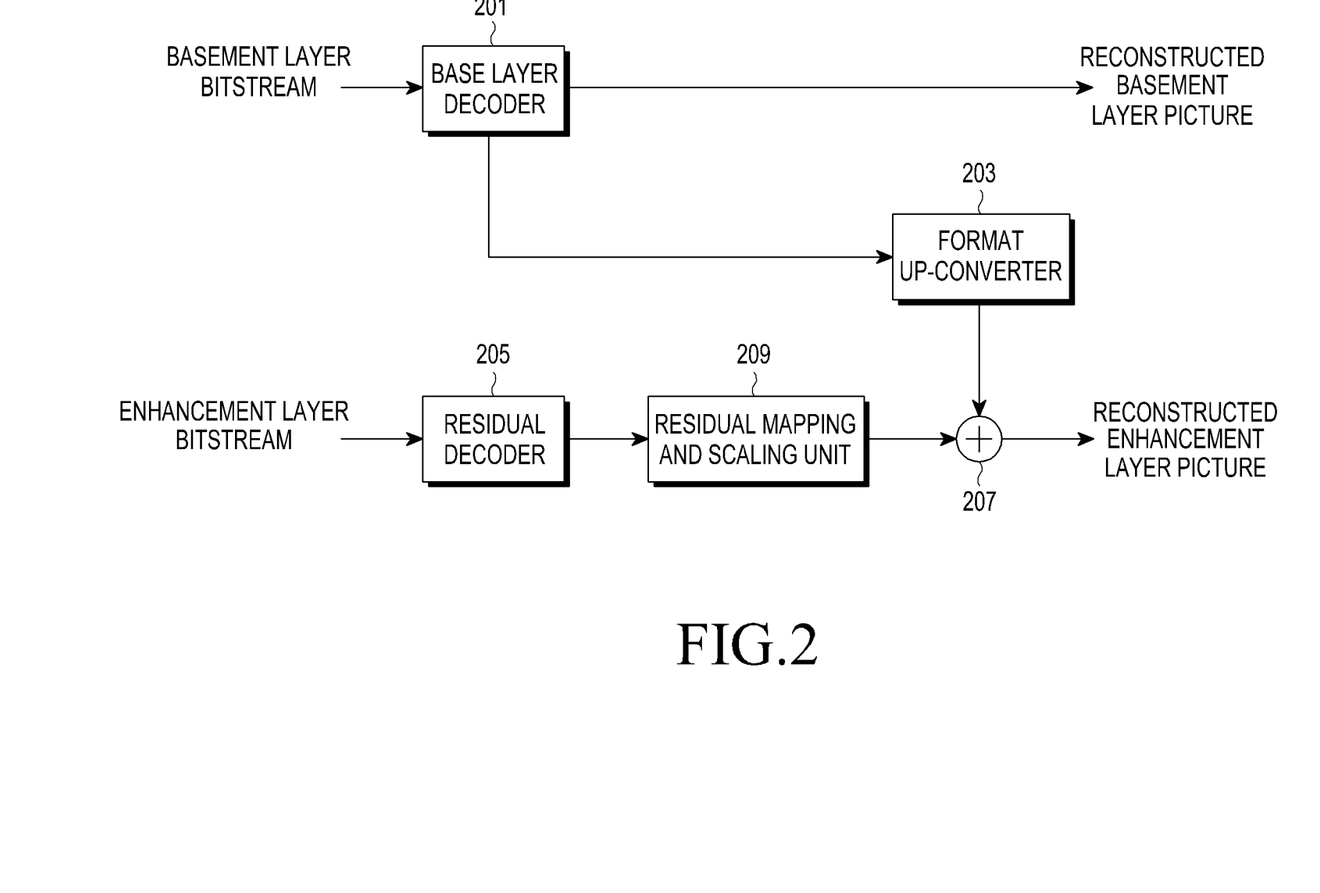
FIG. 2 is a block diagram of a multi-layer structure image decoding apparatus according to an exemplary embodiment.

A hierarchical symbol and level coding scheme and a hierarchical entropy coding scheme according to an exemplary embodiment may be applied to the hierarchical image encoding apparatus illustrated in FIG. 1, and to the hierarchical image decoding apparatus illustrated in FIG. 2. The apparatus illustrated in FIG. 2 is for decoding the bitstream that the image encoding apparatus illustrated in FIG. 1 outputs.

FIG. 1 is a block diagram of a multi-layer structure image encoding apparatus 100 according to an exemplary embodiment.

Referring to FIG. 1, the image encoding apparatus 100 converts a picture restored, i.e., reconstructed from an encoded basement layer picture into an enhancement layer picture. Apparatus 100 encodes a difference (residual) between the input enhancement layer picture and the picture reconstructed from the basement layer picture. The image encoding apparatus 100 outputs a basement layer bitstream and an enhancement layer bitstream by encoding an input image. The basement layer picture and the enhancement layer picture may have different resolutions, image sizes, or view points (i.e., may represent different points of view).

In the embodiment illustrated in FIG. 1, the input image and the image processed in the enhancement layer may have a high resolution, a large size, or a certain view point, while the image processed in the basement layer may have a comparatively lower resolution, a comparatively smaller size, or another view point. In FIG. 1, a format down-converter 101 down-converts the input image into an image format of the basement layer, which may be understood to be a basement layer image format. Herein, format down-conversion may refer to, for example, converting an image format into a lower resolution format, a smaller bit depth format, a reduced chroma format, or a combination of two or more of the foregoing.

In FIG. 1, a basement layer encoder 103 encodes an input basement layer picture in a known manner by using an image encoder based on video codecs such as, for example, VC-1, H.264, Moving Picture Experts Group (MPEG)-4 Part 2 Visual, MPEG-2 Part 2 Video, Audio Video Standard (AVS), Joint Photographic Experts Group (JPEG) 2000, or the like, and outputs a basement layer bitstream.

The basement layer encoder 103 outputs the basement layer picture, reconstructed in the basement layer picture encoding process, to a format up-converter 105. In FIG. 1, the format up-converter 105 up-converts the reconstructed basement layer picture into, for example, a higher resolution, a larger bit depth, an extended chroma format, or a combination of two or more of the foregoing. The input image being input to the format down-converter 101 is also input to a subtractor 107. The subtractor 107 outputs a residual picture corresponding to a difference between the input image and the format up-converted image from the format up-converter 105. A residual encoder 109 residual-encodes the input residual picture and outputs an enhancement layer bitstream. The residual picture output from the subtractor 107 is input to a residual mapping and scaling unit 111 to be converted into a predetermined number of bits through linear scaling. The residual mapping and scaling unit 111 may be selectively provided.

FIG. 2 is a block diagram of a multi-layer structure image decoding apparatus 200 according to an exemplary embodiment.

Referring to FIG. 2, the image decoding apparatus 200 outputs a reconstructed basement layer picture by decoding a basement layer bitstream, and outputs a reconstructed enhancement layer picture by format up-converting the reconstructed basement layer picture. That is, the image decoding apparatus 200 restores the residual picture that was originally encoded in the image encoding apparatus 100 illustrated in FIG. 1. It does this by residual-decoding the enhancement layer bitstream, and outputs the reconstructed enhancement layer picture by adding the reconstructed residual picture to the image format up-converted from the reconstructed basement layer picture (i.e., the format up-converted image from format up-converter 203).

In FIG. 2, the image decoding apparatus 200 is constructed according to a hierarchical structure including basement layer processing and enhancement layer processing, so as to output both a reconstructed basement layer picture and also a reconstructed enhancement layer picture. This is accomplished by independently decoding the basement layer and the enhancement layer bitstreams which were previously encoded by the image coding apparatus 100 of FIG. 1. The basement layer picture and the enhancement layer picture may have different resolutions, image sizes, or represent different points of view.

In FIG. 2, a basement layer decoder 201 decodes an input basement layer bitstream using a decoding scheme corresponding to the video codec that was used in the basement layer encoder 101 of FIG. 1, and outputs a reconstructed basement layer picture. The basement layer picture reconstructed by the basement layer decoder 201 is output to a format up-converter 203 as well. In FIG. 2, the format up-converter 203 up-converts the reconstructed basement layer picture into the video format of the enhancement layer. In FIG. 2, a residual decoder 205 outputs a residual picture generated by residual-decoding the input enhancement layer bitstream. The decoded residual picture is added to the up-converted image from format up-converter 203 by an adder 207, and then is subsequently output as a reconstructed enhancement layer picture. The residual picture output from the residual decoder 205 is input to a residual mapping and scaling unit 209 to be converted into a predetermined number of bits through linear scaling. The residual mapping and scaling unit 209 may be selectively provided.

Entropy encoding/decoding using symbol and level encoding/decoding according to an exemplary embodiment may be performed by the residual encoder 109 of FIG. 1 and the residual decoder 205 of FIG. 2, or may be performed by separate components (not shown) connected with the residual encoder 109 and the residual decoder 205.

A description will now be made of a symbol and level encoding/decoding method which has been proposed for use in connection with hierarchical image processing (which may be referred to herein as a "proposed method"). A description will also be made of an entropy encoding/decoding method that uses the symbol and level encoding/decoding method according to an exemplary embodiment. The following embodiment is applicable not only to an image codec of the VC series as proposed in a standardization organization, e.g., the Society of Motion Picture and Television Engineers (SMPTE), but also to various other image processing techniques for processing an image according to a hierarchical structure.

Figure 3:
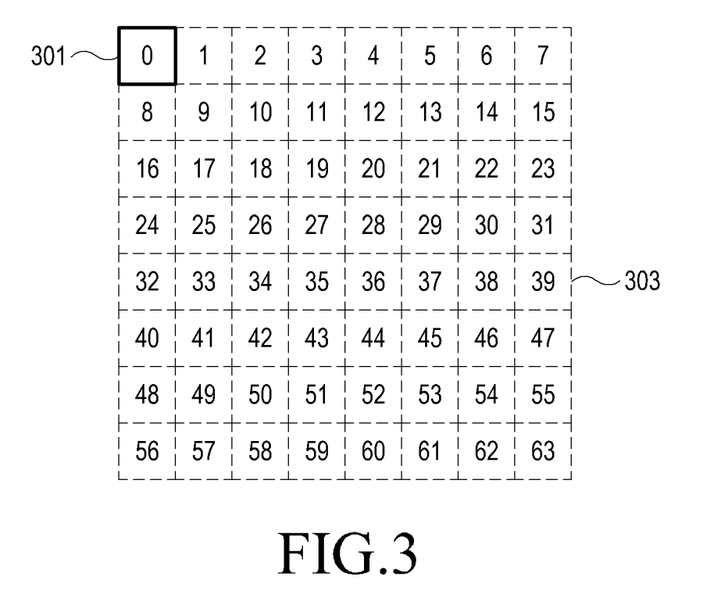
FIG. 3 is a diagram for describing Direct Current (DC) and Alternating Current (AC) coefficients in an 8×8 pixel block.

In general image processing, block-based DCT is used for the DCT transformation of a residual picture. DCT may be performed by mapping, for example, an 8×8 pixel block to a frequency domain. A macroblock is made of four adjacent 8×8 pixel blocks. Through DCT, an 8×8 pixel block of a residual picture, which is an input image, is transformed into 64 coefficients including a single quantized DC coefficient 301 and 63 AC coefficients 303 (marked with dotted lines). This is illustrated in FIG. 3. Generally, after DCT, the pixel data mainly has coefficients with non-zero values in the DC or low-frequency region, while it mainly has coefficients with values of zero in the high-frequency region. By taking advantage of this situation, the compression rate can be improved by compressing the pixel block.

In symbol encoding according to an exemplary embodiment, a hierarchical symbol corresponds to a block composed of DCT coefficients (one DC coefficient or at least one AC coefficient), which will hereinafter be referred to as "a coefficient block", and each coefficient block is expressed as a representative coefficient such as "0", "1", or "2" according to values of the DCT coefficients of the block. In the exemplary embodiment, the representative coefficient such as "0", "1", or "2" will be defined as a Coefficient-Significant Type (CST). Accordingly, the symbol corresponding to a block of the DC coefficient or the at least one AC coefficient can also be expressed with a CST of one of "0", "1", and "2".

In an exemplary embodiment, it is assumed that a CST of "0" indicates a type in which values of at least one AC coefficient included in the coefficient block are all 0, a CST of "1" indicates a type in which the largest value among the values of the AC coefficients included in the coefficient block is 1, and a CST of "2" indicates a type in which the largest value among the values of the AC coefficients included in the coefficient block is greater than 1.

Based on the foregoing assumption, a known approach to symbol coding and level coding will be described with reference to FIGS. 4A through 4E. In FIGS. 4A through 4E, blocks expressed with different shades indicate different coefficient blocks, assuming an 8×8 pixel block is expressed with 64 coefficients. In FIGS. 4A through 4E, 64 DCT-transformed coefficients are re-ordered or re-arranged in an order of low-frequency components to high-frequency components, and then are sequentially arranged from top left to bottom right.

Conventional symbol coding performs zero-checking to search for a symbol corresponding to an AC coefficient "0" in units of up to 2 symbols, while changing the number of AC coefficients constituting a coefficient block.

Figure 13:
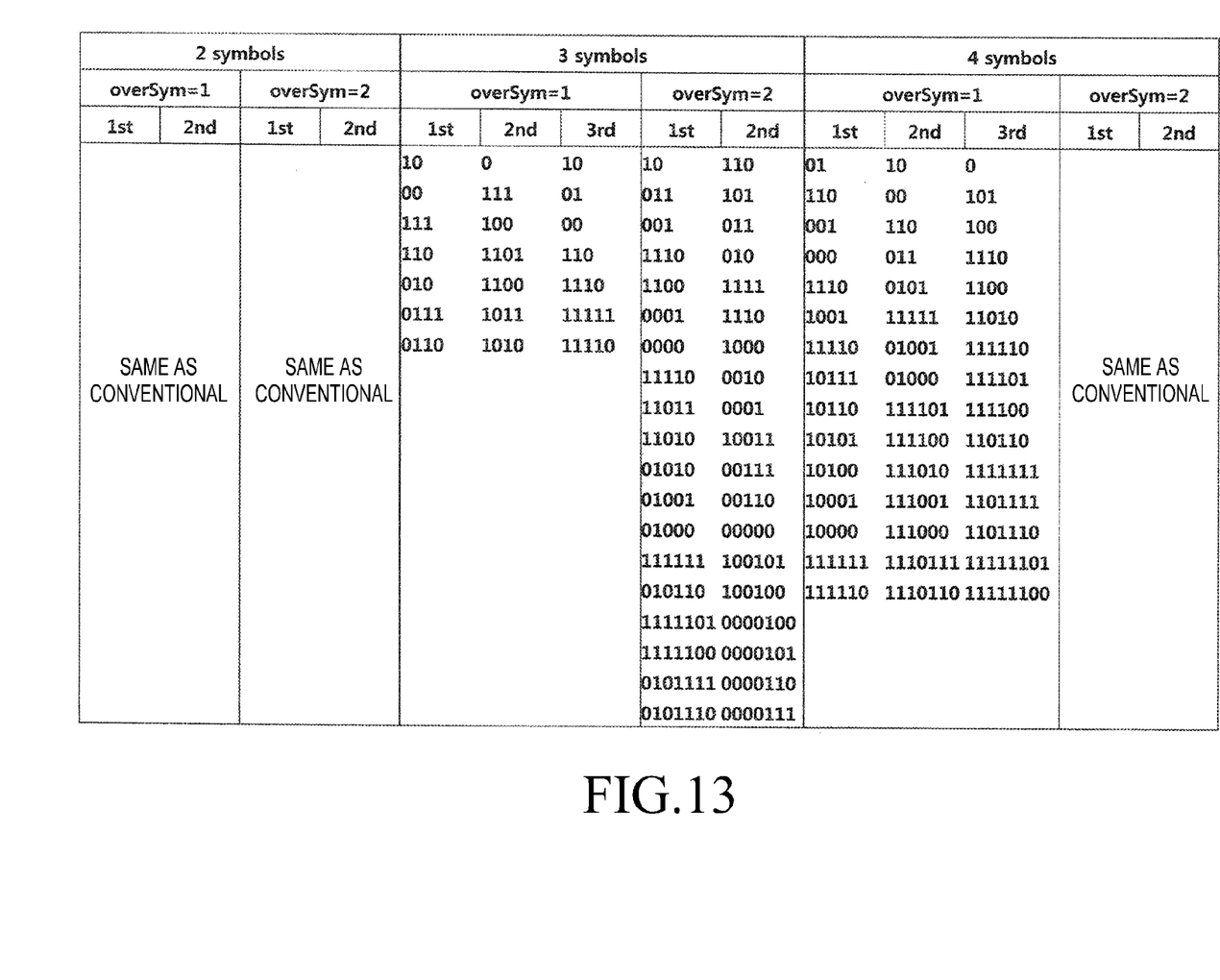
FIG. 13 is a diagram illustrating an example of an updatable Huffman table according to an exemplary embodiment.

In an exemplary embodiment, the coefficients of the residual picture are divided in 2-symbol units, 3-symbol units, or 4-symbol units, and symbol coding is performed in 2-symbol units, 3-symbol units, or 4-symbol units according to a context model corresponding to each symbol unit. The context model is based on a structure in which coefficients of a residual picture are layered and entropy-coded. That is, probability characteristics regarding a coefficient block represented by 3 symbols are acquired, and probability characteristics regarding a coefficient block represented by 4 symbols are acquired. For a 2-symbol case, known probability characteristics are used. Shown in FIG. 13 is an example of a Huffman table proposed according to probability characteristics corresponding to the number of symbols, i.e., a context model in an exemplary embodiment.

With reference to FIGS. 4A through 4E, symbol encoding according to the exemplary embodiment will be compared with known symbol coding.

Figure 4A:
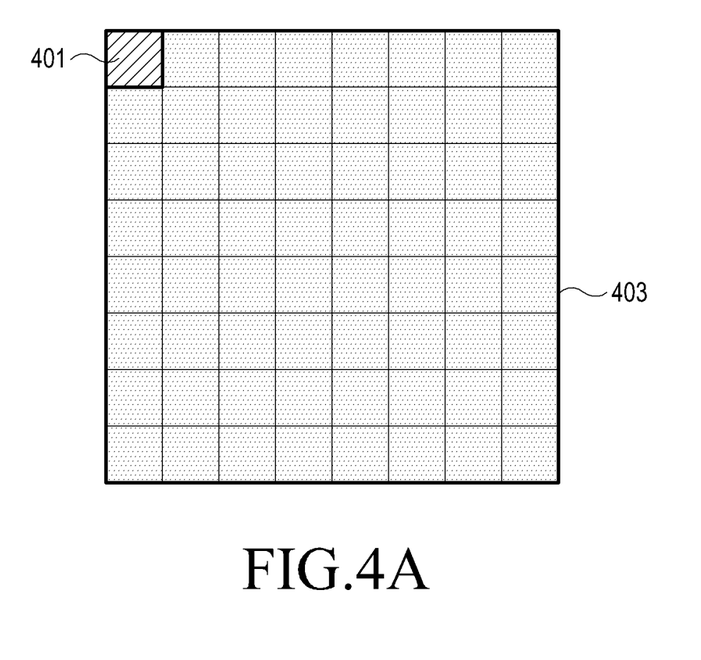
FIGS. 4A through 4E are diagrams for comparing a symbol coding scheme according to the exemplary embodiment with a known symbol coding scheme.
Figure 4B:
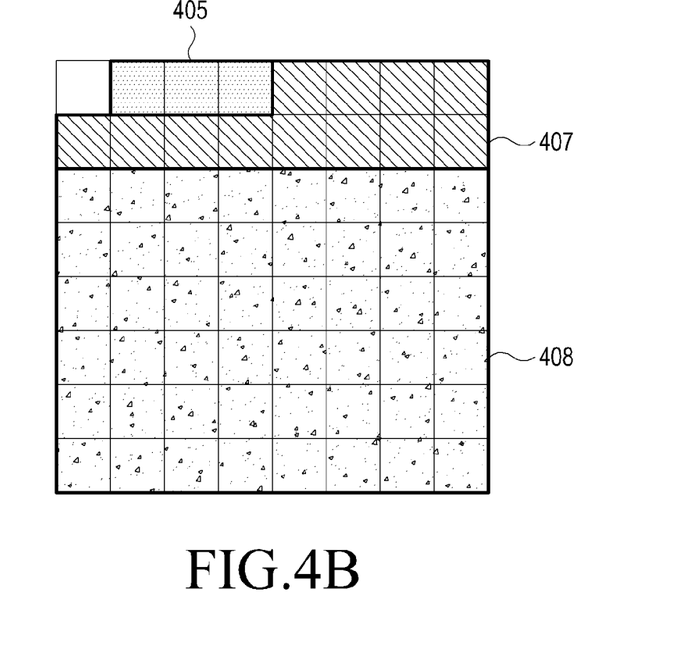

With symbol encoding according to the exemplary embodiment, symbol encoding is performed on a coefficient block 401 corresponding to one DC coefficient and a coefficient block 403 including 63 AC coefficients, as illustrated in FIG. 4A. If the CST of the coefficient block 401 is "2" and the largest CST of the coefficient block 403 is "1", symbol encoding may be expressed as, for example, (2, 1). In this case, since the largest CST of the coefficient block 403 is "1", symbol encoding according to the exemplary embodiment hierarchically divides the 63 AC coefficients as illustrated in FIG. 4B to find out an AC coefficient of 0 among a plurality of AC coefficients. That is, the 63 AC coefficients are 3 hierarchical blocks 405, 407, and 408 composed of 3 blocks, 12 blocks, and 48 blocks, respectively, in the direction from top left to bottom right, and zero-checking is performed on each of the 3 hierarchical blocks 405, 407, and 408. If there is a non-zero value in any of the 3 hierarchical blocks 405, 407, and 408, the corresponding hierarchical block is itself again divided into a plurality of hierarchical blocks for subsequent zero-checking.

In an exemplary embodiment, hierarchical block division may be performed until a block can be divided by 3 CSTs or 4 CSTs. Symbol encoding is performed on each of the hierarchical blocks divided by 3 CSTs or 4 CSTs. For example, in a first layer where the 8×8 pixel block is divided into the coefficient block 401 corresponding to the DC coefficient and the coefficient block 403 corresponding to the AC coefficients as illustrated in FIG. 4A, 2-symbol encoding is performed with the CST of the DC coefficient and the largest CST among the CSTs of the AC coefficients.

If none of the CSTs of the AC coefficients 403 is zero in FIG. 4A, a second layer is formed in which the coefficient block 403 is divided into the 3 hierarchical blocks 405, 407, and 408 as illustrated in FIG. 4B. In the second layer, 3-symbol encoding is performed with the largest CSTs from the block 405 having 3 CSTs, the block 407 having 12 CSTs, and the block 408 having 48 CSTs, respectively.

If none of the 3 CSTs of the block 405 is zero, the block 405 cannot be divided any further, and 3-symbol encoding is performed with the 3 CSTs.

Figure 4C:
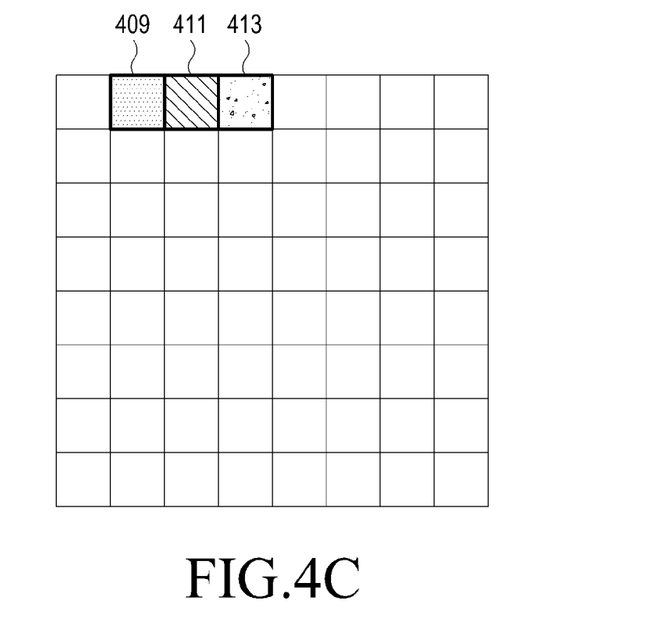
Figure 4D:
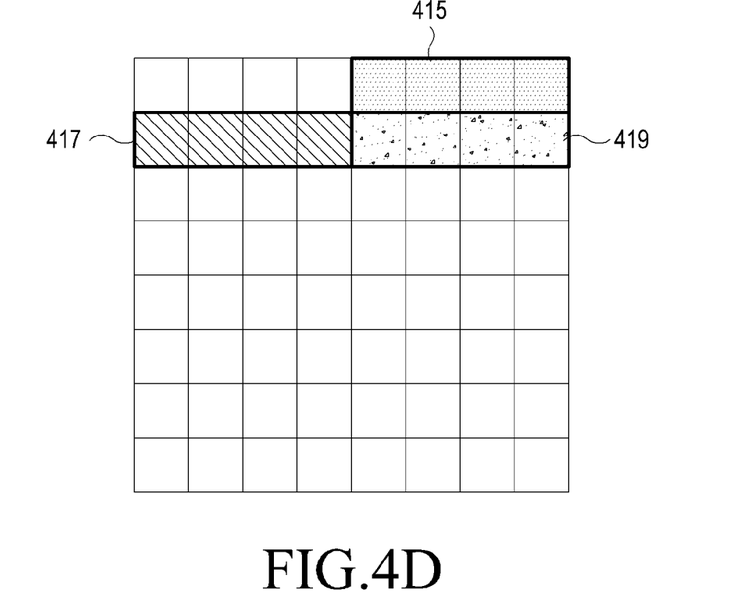

If none of the 12 CSTs of the block 407 is zero, the block 407 is hierarchically divided into 3 blocks 415, 417, and 419, each having 4 CSTs, as illustrated in FIG. 4D, and 3-symbol encoding is performed with the largest CSTs among the respective 4 CSTs of the blocks 415, 417, and 419. In this case, 4-symbol encoding is performed on each of the blocks 415, 417, and 419 having 4 CSTs.

Figure 4E:
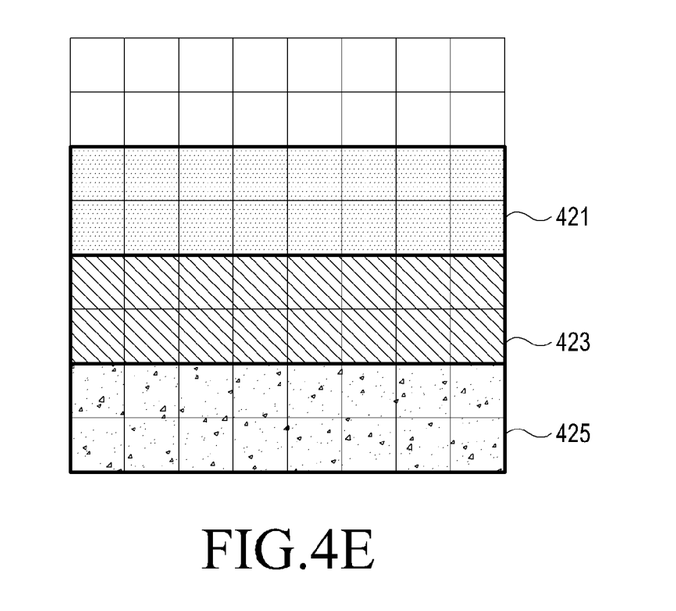

If none of the 48 CSTs of the block 408 illustrated in FIG. 4B is zero, the block 408 is also hierarchically divided into 3 blocks 421, 423, and 425, each having 16 CSTs as illustrated in FIG. 4E, and 3-symbol encoding is performed with the largest CSTs of the respective blocks 421, 423, and 425.

If none of the CSTs of the block 421 is zero, the block 421 is hierarchically divided into 4 blocks, and 4-symbol encoding is performed.

If none of the CST of each of the 4 blocks hierarchically divided from the block 421 is zero, 4-symbol encoding is performed separately.

By way of contrast, in known symbol coding, for 3-symbol coding and 4-symbol coding, 2-symbol coding is recursively performed. For example, when 3 CSTs 409, 411, and 413 illustrated in FIG. 4C are 3-symbol-coded, 2-symbol coding is performed with the CST 409 and the larger of CST 411 and CST 413. If neither the CST 411 nor the CST 413 is zero, 2-symbol coding is performed once more with these two CSTs 411 and 413. Likewise, conventional 4-symbol coding is also performed by performing 2-symbol coding up to three times on a 2-symbol basis. In this case, zero checking is performed up to two or three times in 3-symbol coding and 4-symbol coding, increasing complexity in encoding/decoding.

The following table shows an algorithm for zero checking according to an exemplary embodiment, which is efficient in a hierarchical structure.

TABLE 1

```
if(ACp3) {
    ACp3_CST
    if(L2[1]) {
        if(L2[1] == 1) {
            L2[1]_CST
        }
    }
```

In Table 1, when "ACp3" is the largest CST among the CSTs of the 48 AC coefficients of the coefficient block including the blocks 421, 423, and 425 illustrated in FIG. 4E, "ACp3_CST" indicates that 3-symbol coding is performed with the three largest CSTs of the blocks 421, 423, and 425. A symbol decoder knows the largest CST L2[1] of the block 421 by decoding "ACp3_CST". The symbol decoder may acquire CSTs L2[1]_CST of first 4 AC coefficients of the block 421, and by level-decoding the CSTs L2[1]_CST, may immediately acquire DCT coefficients corresponding to the first 4 blocks of the block 421. While not shown in Table 1, the algorithm of Table 1 may be identically applied to the other blocks 423 and 425 in FIG. 4E. In the symbol encoding according to the exemplary embodiment, the number of times of zero checking is reduced, in 3-symbol encoding and 4-symbol encoding, when compared to known coding.

As mentioned previously, known coding performs symbol coding in units of 2 symbols, and performs zero checking with respect to 3 symbols or 4 symbols through two or three steps, causing a delay in symbol coding; whereas symbol coding in units of 3 or more symbols as in an exemplary embodiment, zero checking can be performed in a single step, thereby reducing a delay in symbol encoding. That is, the exemplary embodiment has been proposed to enable not only symbol encoding in units of 2 symbols, but also symbol encoding in units of at least 2 symbols such as 3 symbols or 4 symbols, and can be implemented as shown in Table 1. Herein, to perform symbol encoding in units of 3 or more symbols, a plurality of symbol encoders may be provided.

Hereinafter, a hierarchical entropy encoding apparatus and method according to an exemplary embodiment will be described with reference to FIGS. 5 through 8, 13, and 14.

Figure 5:
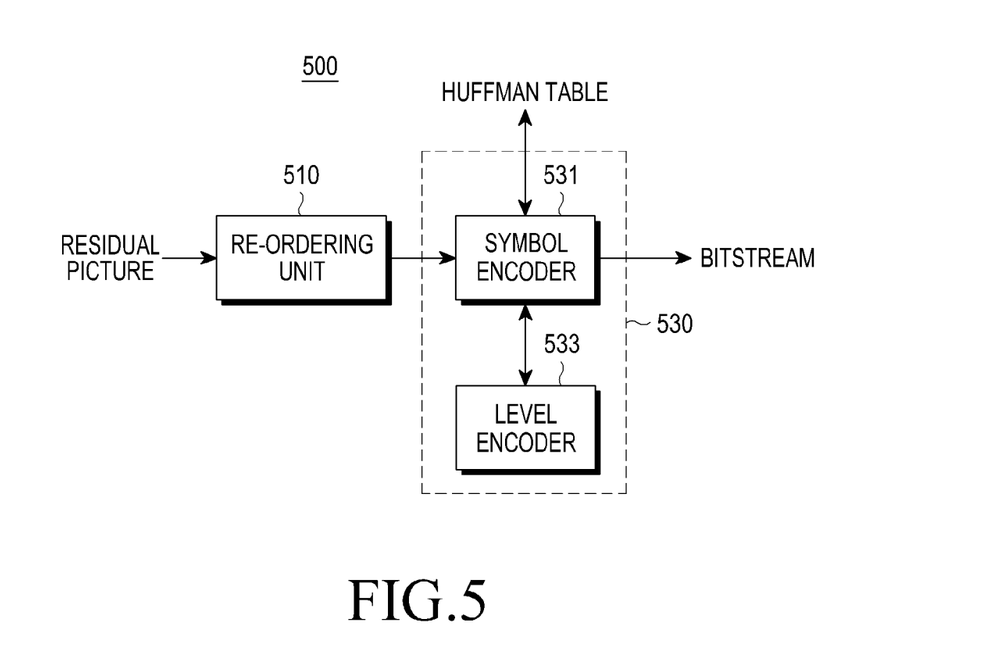
FIG. 5 is a block diagram of an entropy encoding apparatus according to an exemplary embodiment.
Figure 6:
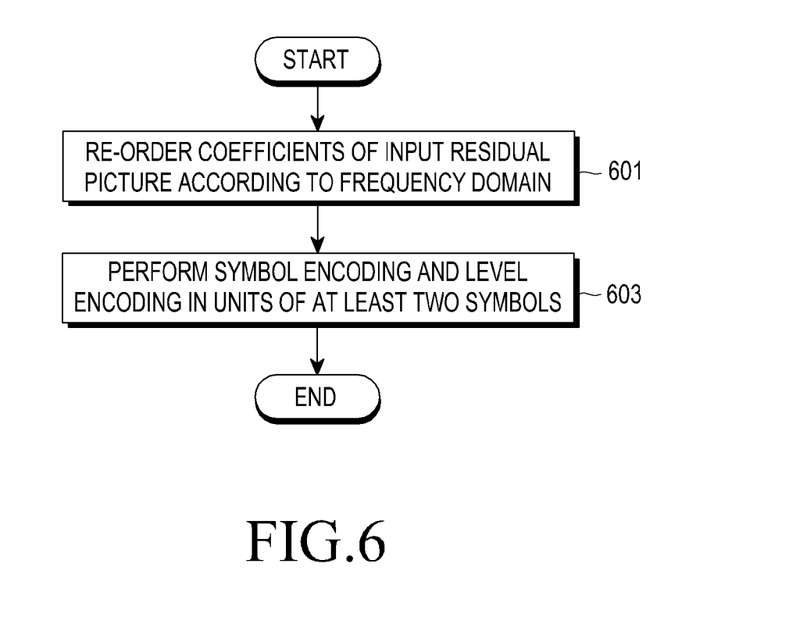
FIGS. 6 through 8 are flowcharts of an entropy encoding method according to an exemplary embodiment.
Figure 7:
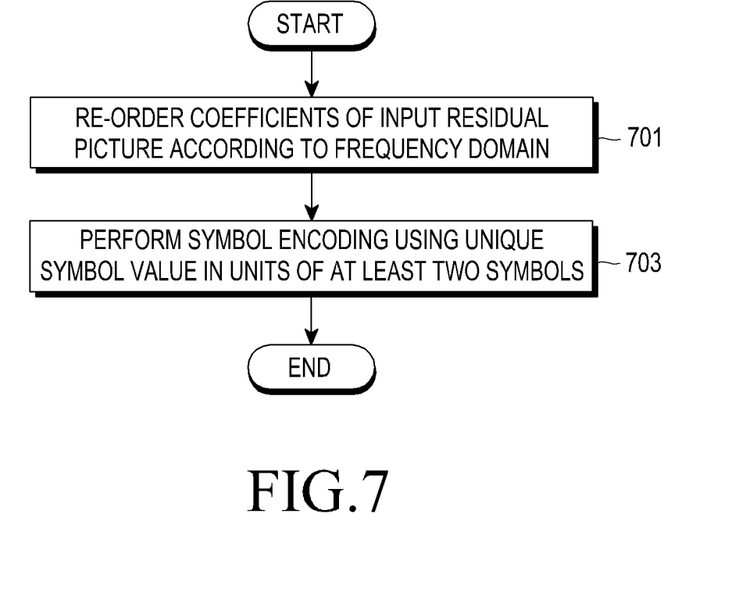
Figure 8:
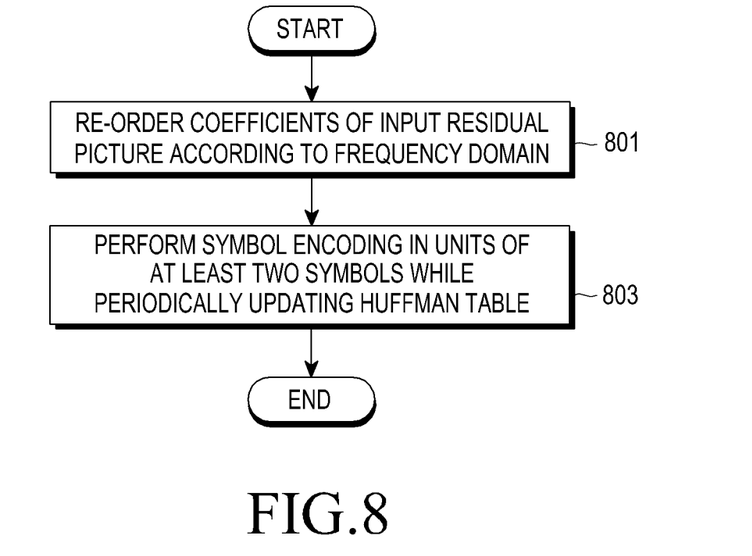

FIG. 5 is a block diagram of an entropy encoding apparatus 500 according to an exemplary embodiment, and FIGS. 6 through 8 are flowcharts of an entropy encoding method according to an exemplary embodiment. Entropy encoding may include re-ordering, symbol encoding, and level encoding.

Referring to FIG. 5, a re-ordering (or re-arranging) unit 510 re-orders or re-arranges coefficients of an input residual picture according to a frequency domain. Through re-ordering, low-frequency components and high-frequency components are separated and arranged for efficient entropy encoding. A symbol encoder 531 symbol-encodes the re-ordered coefficients of the residual picture, and a level encoder 533 performs level-encoding to indicate levels and signs of the encoded symbols. The symbol encoder 531 and the level encoder 533 may be provided separately or as a single encoder 530, as shown in FIG. 5.

Referring to FIG. 6, once the coefficients of the input residual picture are re-ordered in step 601, the symbol encoder 531 and the level encoder 533 perform symbol encoding and level encoding on the re-ordered coefficients of the residual picture in units of at least two symbols in step 603.

Herein, comparing an example of symbol encoding in units of at least two symbols with known 2-symbol coding, known 2-symbol coding recursively repeats 2-symbol coding for 4-symbol coding of {2, 2, 0, 1}, which requires the 2-symbol coding operation to occur up to three times, while in an exemplary embodiment, 4-symbol encoding can be performed at a time, thus reducing the computational complexity of the code and improving a coding gain.

The following table shows an example of an algorithm, for entropy encoding, in which symbol encoding and level encoding are performed together according to the exemplary embodiment of FIG. 6.

TABLE 2

```
if(DC) {
    COEFF_LEVEL[0]
}           if(L2[1]) {
if(AC) {
    AC_CST
    if(ACp1) {
        ACp1_CST
        CALL_COEFF_LEVEL(1,4)
    }
```

In Table 2, "COEFF_LEVEL[0]" indicates a level and a sign of a non-zero DC coefficient, and "AC_CST" indicates the largest CST of three coefficient blocks, e.g., the blocks 405, 407, and 408 of FIG. 4B, which are divided from 63 AC coefficients. "ACp1" indicates the largest CST of the block 405, and "ACp2" and "ACp3", although not shown in Table 2, indicate the largest CSTs of the blocks 407 and 408.

"CALL_COEFF_LEVEL" indicates a process of acquiring a level and a sign of an AC coefficient when the AC coefficient corresponds to a CST more than "1". For example, in Table 2, CALL_COEFF_LEVEL (1,4) indicates a level and a sign of an AC coefficient when a CST for each of the divided three blocks 405, 407, and 408 is more than "1".

In an exemplary embodiment, level encoding is performed together with symbol encoding several times during the process of symbol encoding the coefficient blocks. By way of contrast, in the known approach, level coding is performed on all symbols only after the completion of symbol coding, but in the exemplary embodiment, level encoding is performed concurrently with symbol encoding, such that it is not necessary to check a corresponding symbol value during level encoding, thereby reducing repetitive operations.

In an exemplary embodiment illustrated in FIG. 7, once the coefficients of the input residual picture are re-ordered in step 701, the symbol encoder 531 performs symbol-encoding in step 703 with respect to the re-ordered coefficients of the input residual picture in units of at least two symbols by using unique symbol values.

In known symbol coding, and in particular in an application of Variable Length Coding (VLC), such as Huffman coding, the order of each code word is previously set and the order is adjusted based on the frequency of occurrence of a symbol corresponding to each code word in a Huffman tree between an encoder and a decoder. In this case, the encoder and the decoder have to access a memory in which every symbol is coded so as to know the mapping value to which a CST value is indicated by the order (the order being based on the frequency of occurrence of a symbol), causing a delay in encoding/decoding.

In the exemplary embodiment illustrated in FIG. 7, during symbol encoding, a unique symbol value is acquired from the symbol through a bitwise operation (instead of through a value derived from a frequency-of-occurrence based order), and a position of a unique symbol value corresponding to each code word in the Huffman tree is adjusted according to the frequency of occurrence of the symbol. In other words, the unique symbol value corresponds to each code word of the Huffman tree, and is calculated by performing a bit-shifting operation with respect to the symbol, as will be described below.

The bitwise operation is performed by, for example, in the case of 2 symbols (2, 1), performing a bit-shift operation on the former "2" by 2 bits to the left and adding the latter "1". Thus, the 2 symbols (2, 1) gets a unique symbol value of "9" (a binary number "1001"). In a decoding process, the foregoing bitwise operation is performed inversely, such that "9" (binary number "1001") is shifted by 2 bits to the right to extract the former "2" of (2, 1), and the last two bits "01" of "1001", which is the binary version of "9", is extracted. For example, in case of 3 symbols (A, B, C), "A" is shifted by 4 bits to the left, "B" is shifted by 2 bits to the left, and "C" is added. In case of 4 symbols, three of the 4 symbols are shifted by 6 bits, 4 bits, and 2 bits, respectively, from the left to the right, and the remaining last symbol is added. In the decoding process, the foregoing bit operation is inversely performed.

Therefore, according to the exemplary embodiment illustrated in FIG. 7, the memory access which so often is required according to the known symbol encoding can be avoided.

In the exemplary embodiment illustrated in FIG. 8, once the coefficients of the input residual picture are re-ordered in step 801, the symbol encoder 531 periodically updates the Huffman table shown in FIG. 13 in terms of Rate Distortion Optimization (RDO), and at the same time, in step 803 performs symbol encoding in units of at least two symbols. In FIG. 13, "overSym=1" indicates a table referred to when the largest CST from AC coefficients in a corresponding number of symbols is "1" and "overSym=2" indicates a table referred to when the largest CST from AC coefficients in a corresponding number of symbols is "2". In the same "overSym" value, a table which is optimal for RDO is selected. Herein, an update interval for updating the Huffman table may be set in the range of from several macro blocks to several tens of macro blocks. Detecting an update interval for the Huffman table and updating the Huffman table every update interval may be performed by the symbol encoder 531 illustrated in FIG. 5. Alternatively, a separate component (not shown) may be provided to detect when to apply updates to the Huffman table and to carry out the updates.

It will be appreciated that the exemplary embodiments illustrated in FIGS. 6 and 7 may be implemented in coordination with the exemplary embodiment shown in FIG. 8.

With reference to FIGS. 9 through 13 and 15, a description will now be made of a hierarchical entropy decoding apparatus and method according to an exemplary embodiment.

Figure 9:
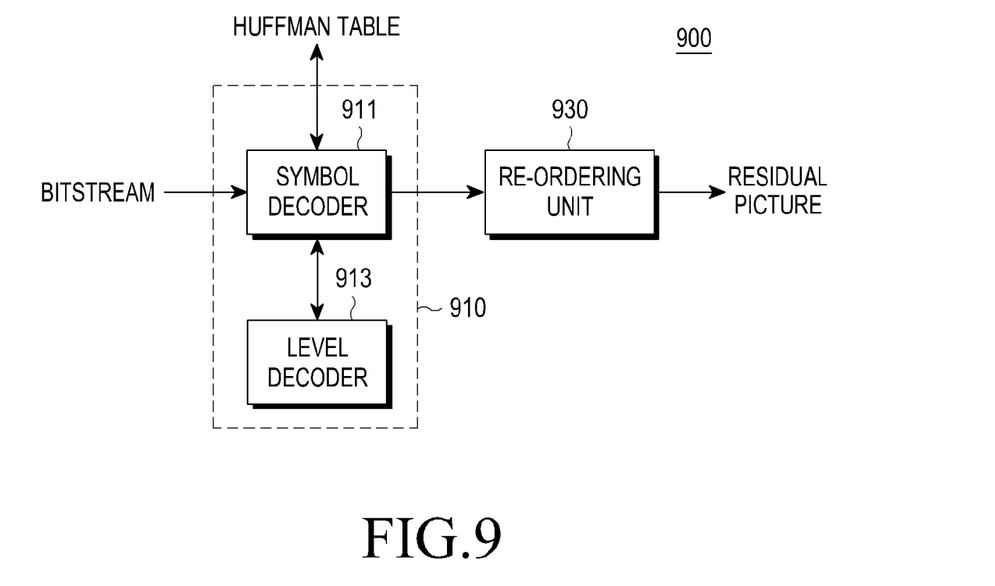
FIG. 9 is a block diagram of an entropy decoding apparatus according to an exemplary embodiment.
Figure 10:
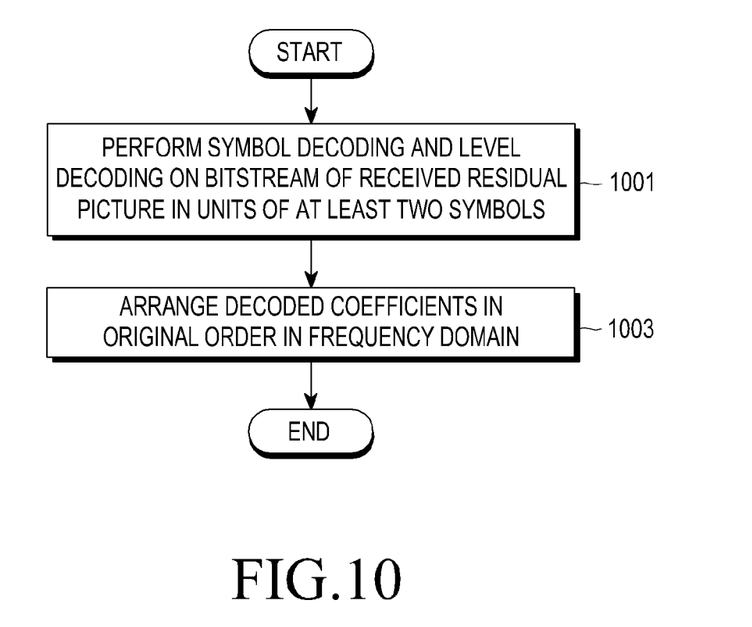
FIGS. 10 through 12 are flowcharts of various entropy decoding methods according to exemplary embodiments.
Figure 11:
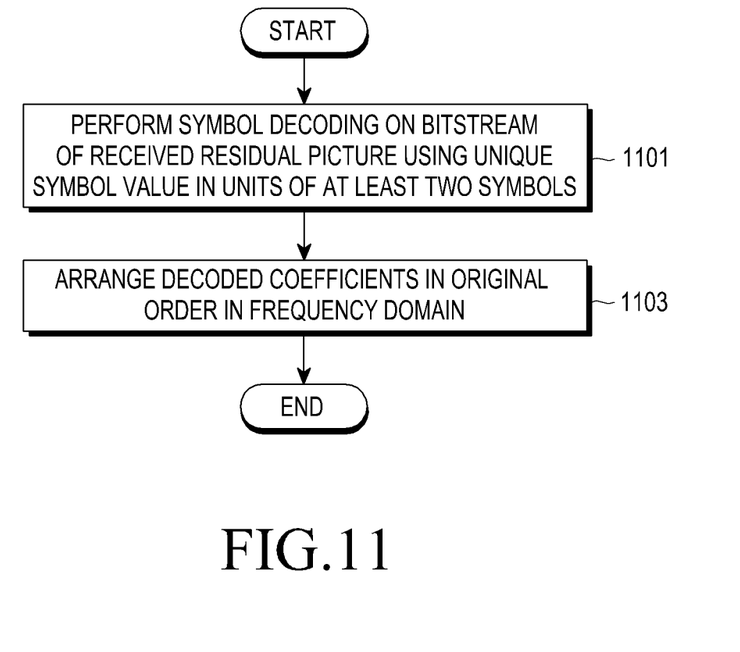
Figure 12:
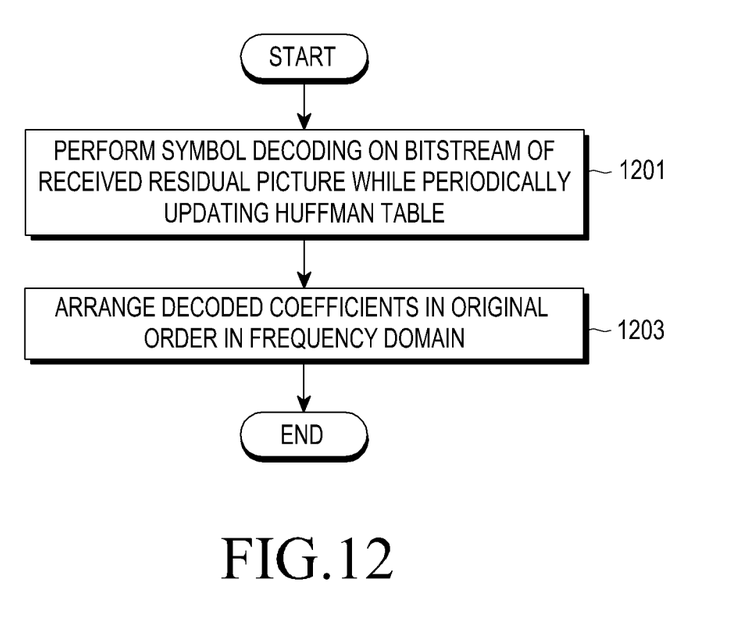

FIG. 9 is a block diagram of an entropy decoding apparatus 900 according to an exemplary embodiment, and FIGS. 10 through 12 are flowcharts of various entropy decoding methods according to an exemplary embodiment. Entropy decoding may include symbol decoding, level decoding, and ordering (or arrangement).

Referring to FIG. 9, a symbol decoder 911 performs symbol decoding on a bitstream of a received residual picture, and a level decoder 913 performs level decoding to indicate levels and signs of decoded symbols. The symbol decoder 911 and the level decoder 913 may be separately provided or provided as a single decoder 910, as illustrated in FIG. 9. An ordering (or arranging) unit 930 orders or arranges the symbol-decoded and level-decoded coefficients of the residual picture in their original order in the frequency domain.

In the exemplary embodiment illustrated in FIG. 10, the symbol decoder 911 and the level decoder 913 simultaneously perform symbol decoding and level decoding on the bitstream of the received residual picture in units of at least two symbols in step 1001. The ordering unit 930 orders the decoded coefficients in their original order in the frequency domain in step 1003.

In the exemplary embodiment illustrated in FIG. 11, the symbol decoder 911 performs symbol decoding on the bitstream of the received residual picture in units of at least two symbols by using the aforementioned unique symbol value in step 1101. The ordering unit 930 orders the decoded coefficients in their original order in the frequency domain in step 1103.

In the exemplary embodiment illustrated in FIG. 12, the symbol decoder 911 performs symbol decoding on the bitstream of the received residual picture while periodically updating the Huffman table in step 1201, as previously explained. The ordering unit 930 orders the decoded coefficients in their original order in the frequency domain in step 1203.

The above-described algorithms for entropy encoding in which symbol encoding and level encoding are performed together, in which symbol encoding is performed in units of at least two symbols, in which the symbol value is unique, and in which the Huffman Table shown in FIG. 13 is updated, may also be applied to entropy decoding based on the same principles.

In the foregoing exemplary embodiment, the methods illustrated in FIGS. 10 and 11 may be implemented as well.

Figure 14:
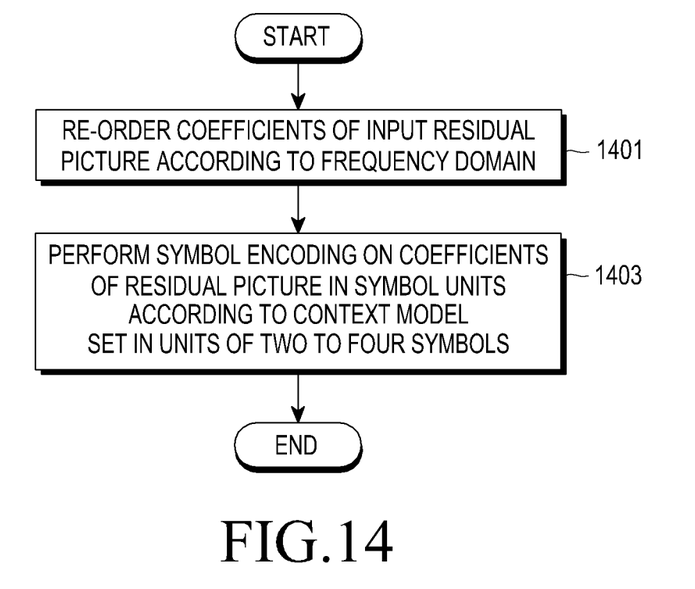
FIG. 14 is a flowchart of an entropy encoding method in units of 2, 3, or 4 symbols according to an exemplary embodiment.

FIG. 14 is a flowchart of an entropy encoding method in units of 2, 3, or 4 symbols according to an exemplary embodiment.

Referring to FIG. 14, the coefficients of the input residual picture are re-ordered according to the frequency domain in step 1401. The coefficients of the residual picture are symbol-encoded in units of 2, 3, or 4 symbols according to a context model set in units of 2, 3, or 4 symbols in step 1403.

Figure 15:
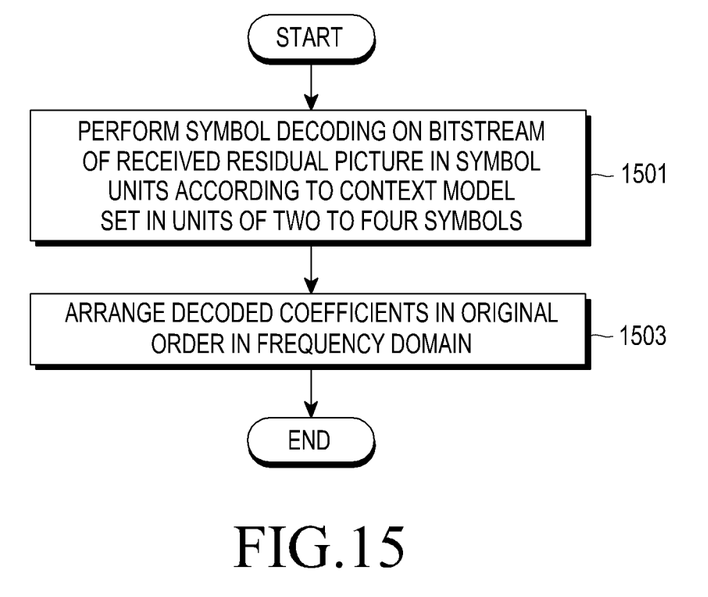
FIG. 15 is a flowchart of an entropy decoding method in units of 2, 3, or 4 symbols according to an exemplary embodiment.

FIG. 15 is a flowchart of an entropy decoding method in units of 2, 3, or 4 symbols according to an exemplary embodiment.

Referring to FIG. 15, symbol decoding is performed on the bitstream of the received residual picture in units of 2, 3, or 4 symbols according to a context model set in units of 2, 3, or 4 symbols in step 1501. The decoded coefficients are ordered in their original order in the frequency domain in step 1503.

In FIGS. 14 and 15, symbol encoding/decoding includes hierarchically performing zero checking on symbols in units of 2, 3, or 4 symbols. The context model corresponds to the Huffman table shown in FIG. 13, which is set in units of 2, 3, or 4 symbols.

The symbol encoding/decoding methods illustrated in FIGS. 14 and 15 may be applied to symbol encoding/decoding in units of at least two symbols.

It will be appreciated that various modifications to the exemplary embodiments described above, including combinations and sub-combinations of the exemplary embodiments, are foreseen and do not depart from the scope and spirit of the inventive concept.

What is claimed is:

1. An entropy encoding method intended for use in hierarchical image processing, the entropy encoding method comprising:
   re-ordering, by an entropy encoding apparatus, coefficients of an input residual picture according to a frequency domain; and
   performing symbol encoding on the re-ordered coefficients of the residual picture;
   wherein the encoding takes place in symbol units;
   wherein the number of symbols in the symbol units can have a value in the range of two to four symbols; and
   wherein the respective number of symbols in a symbol unit is based on a corresponding context model set in units of two to four symbols.

2. The entropy encoding method of claim 1, wherein the symbol encoding comprises hierarchically performing zero checking on the symbol units.

3. The entropy encoding method of claim 1, wherein the context model corresponds to a Huffman table which is set in units of two to four symbols.

4. The entropy encoding method of claim 3, further comprising periodically updating the Huffman table with respect to the coefficients of the residual picture.

5. An entropy encoding method in hierarchical image processing, the entropy encoding method comprising:
   re-ordering, by an entropy encoding apparatus, coefficients of an input residual picture according to a frequency domain; and
   performing symbol encoding and level encoding together on the coefficients of the residual picture in symbol units, wherein the number of symbols in the symbol units is at least two symbols.

6. The entropy encoding method of claim 5, wherein the symbol encoding comprises hierarchically performing zero checking on the symbol units, and wherein the number of symbols in the symbol units can have a value in the range of two to four symbols.

7. The entropy encoding method of claim 6, wherein the symbol encoding is performed by using a Huffman table which is set in units of two to four symbols.

8. An entropy encoding method in hierarchical image processing, the entropy encoding method comprising:
   re-ordering, by an entropy encoding apparatus, coefficients of an input residual picture according to a frequency domain; and
   performing symbol encoding on the coefficients of the residual picture in symbol units by using a unique symbol value;
   wherein the number of symbols in the symbol units is at least two symbols.

9. The entropy encoding method of claim 8, wherein the symbol encoding comprises hierarchically performing zero checking on the symbol units, and wherein the number of symbols in the symbol units can have a value in the range of two to four symbols.

10. The entropy encoding method of claim 8, wherein the symbol encoding is performed by using a Huffman table which is set in units of two to four symbols.

11. The entropy encoding method of claim 10, wherein the unique symbol value is a value corresponding to each code word of the Huffman table, and is calculated by performing a bit-shift operation with respect to a corresponding symbol.

12. The entropy encoding method of claim 11, wherein a position of the unique symbol value is adjusted according to the respective frequency of occurrence of the corresponding symbol.

13. An entropy decoding method in hierarchical image processing, the entropy decoding method comprising:
   performing, by an entropy decoding apparatus, symbol decoding on a bitstream of a received residual picture in symbol units, wherein the number of symbols in the symbol units can have a value in the range of two to four symbols, and wherein the respective number of symbols in a symbol unit is based on a corresponding context model set in units of two to four symbols; and
   ordering the decoded coefficients of the residual picture in an original order in a frequency domain.

14. The entropy decoding method of claim 13, wherein the performing of the symbol decoding comprises hierarchically performing zero checking on the symbol units.

15. The entropy decoding method of claim 13, wherein the context model corresponds to a Huffman table which is set in units of two to four symbols.

16. The entropy decoding method of claim 15, further comprising periodically updating the Huffman table with respect to the coefficients of the residual picture.

17. An entropy decoding method in hierarchical image processing, the entropy decoding method comprising:
performing, by an entropy decoding apparatus, symbol decoding and level decoding together on a bitstream of a received residual picture in symbol units, wherein the number of symbols in the symbol units is at least two symbols; and
ordering the decoded coefficients of the residual picture in an original order in a frequency domain.

18. The entropy decoding method of claim 17, wherein the symbol decoding comprises hierarchically performing zero checking on the symbol units, and wherein the number of symbols in the symbol units can have a value in the range of two to four symbols.

19. The entropy decoding method of claim 18, wherein the symbol decoding is performed by using a Huffman table which is set in units of two to four symbols.

20. An entropy decoding method in hierarchical image processing, the entropy decoding method comprising:
performing, by an entropy decoding apparatus, symbol decoding on a bitstream of a received residual picture in symbol units by using a unique symbol value, wherein the number of symbols in the symbol units is at least two symbols; and
ordering decoded coefficients of the residual picture in an original order in a frequency domain.

21. The entropy decoding method of claim 20, wherein the performing of the symbol decoding comprises hierarchically performing zero checking on the symbol units, and wherein the number of symbols in the symbol units can have a value in the range of two to four symbols.

22. The entropy decoding method of claim 20, wherein the symbol decoding is performed by using a Huffman table which is set in units of two to four symbols.

23. The entropy decoding method of claim 22, wherein the unique symbol value is a value corresponding to each code word of the Huffman table, and is calculated by performing a bit-shift operation with respect to a corresponding symbol.

24. The entropy decoding method of claim 23, wherein a position of the unique symbol value is adjusted according to the respective frequency of occurrence of the corresponding symbol.

25. An entropy encoding apparatus in hierarchical image processing, the entropy encoding apparatus comprising:
a re-ordering unit for re-ordering coefficients of an input residual picture according to a frequency domain; and
a symbol encoder for performing symbol encoding on the re-ordered coefficients of the residual picture in symbol units, wherein the number of symbols in the symbol units can have a value in the range of two to four symbols, and wherein the respective number of symbols in a symbol unit is based on a corresponding context model set in units of two to four symbols.

26. The entropy encoding apparatus of claim 25, wherein the symbol encoder hierarchically performs zero checking on the symbol units.

27. The entropy encoding apparatus of claim 25, wherein the context model corresponds to a Huffman table which is set in symbol units, and wherein the number of symbols in the symbol units can have a value in the range of two to four symbols.

28. The entropy encoding apparatus of claim 27, wherein the symbol encoder periodically updates the Huffman table with respect to the coefficients of the residual picture.

29. An entropy decoding apparatus in hierarchical image processing, the entropy decoding apparatus comprising:
a symbol decoder for performing symbol decoding on a bitstream of a received residual picture in symbol units, wherein the number of symbols in the symbol units can have a value in the range of two to four symbols, and wherein the respective number of symbols in a symbol unit is based on a corresponding context model set in units of two to four symbols; and
an ordering unit for ordering the decoded coefficients of the residual picture in an original order in a frequency domain.

30. The entropy decoding apparatus of claim 29, wherein the symbol decoder hierarchically performs zero checking on the symbol units.

31. The entropy decoding apparatus of claim 29, wherein the context model corresponds to a Huffman table which is set in symbol units, and wherein the number of symbols in the symbol units can have a value in the range of two to four symbols.

32. The entropy decoding apparatus of claim 31, wherein the symbol decoder periodically updates the Huffman table with respect to the coefficients of the residual picture.

33. An entropy encode/decode method intended for use in hierarchical image processing, the method comprising:
processing frequency-domain-ordered coefficients of a residual picture, wherein:
the processing comprising one of symbol encoding performed by a symbol encoder and symbol decoding performed by a symbol decoder;
the processing takes place in symbol units;
the number of symbols in the symbol units can have a value in the range of two to four symbols; and
the respective number of symbols in a symbol unit is based on a corresponding context model set in units of two to four symbols.

34. The method as set forth in claim 33, wherein the processing comprises hierarchically performing zero checking on the symbol units.

35. The method as set forth in claim 33, wherein the context model corresponds to a Huffman table which is set in units of two to four symbols.

36. The method as set forth in claim 35, further comprising periodically updating the Huffman table with respect to the coefficients of the residual picture.

37. The method as set forth in claim 33, wherein:
the processing comprises symbol encoding; and
the symbol encoding is performed together with level encoding on the coefficients.

* * * * *